(12) United States Patent
Nordbruch

(10) Patent No.: US 11,945,473 B2
(45) Date of Patent: Apr. 2, 2024

(54) METHOD FOR DRIVING A MOTOR VEHICLE IN AN AT LEAST SEMIAUTOMATED MANNER

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 17/602,039

(22) PCT Filed: May 22, 2020

(86) PCT No.: PCT/EP2020/064309
§ 371 (c)(1),
(2) Date: Oct. 7, 2021

(87) PCT Pub. No.: WO2020/254063
PCT Pub. Date: Dec. 24, 2020

(65) Prior Publication Data
US 2022/0177004 A1 Jun. 9, 2022

(30) Foreign Application Priority Data
Jun. 21, 2019 (DE) .......................... 102019209050.8

(51) Int. Cl.
*B60W 60/00* (2020.01)
*B60W 30/18* (2012.01)
(Continued)

(52) U.S. Cl.
CPC .. *B60W 60/0051* (2020.02); *B60W 30/18163* (2013.01); *B60W 40/02* (2013.01);
(Continued)

(58) Field of Classification Search
CPC ....... B60W 60/0051; B60W 30/18163; B60W 40/02; B60W 60/0059; B60W 2554/406;
(Continued)

(56) References Cited

U.S. PATENT DOCUMENTS

2015/0187216 A1\* 7/2015 Kwak .............. G08G 1/096783
701/117
2017/0192436 A1\* 7/2017 Min .................... G01C 21/3819
(Continued)

FOREIGN PATENT DOCUMENTS

DE 102014013672 A1 4/2015
DE 102015118489 A1 5/2016
(Continued)

OTHER PUBLICATIONS

International Search Report for PCT/EP2020/064309, dated Sep. 11, 2020.

*Primary Examiner* — Kira Nguyen
(74) *Attorney, Agent, or Firm* — NORTON ROSE FULBRIGHT US LLP; Gerard A. Messina

(57) ABSTRACT

A method for driving a motor vehicle in an at least semi-automated manner. The method includes: receiving surrounding-area signals, which represent a first region of a surrounding area of the motor vehicle monitored with the aid of a surround-sensor system of the motor vehicle; receiving information signals, which represent information that is ascertained outside of the motor vehicle and is in regard to a second region of the surrounding area of the motor vehicle; generating and outputting control signals for controlling the lateral and/or longitudinal guidance of the motor vehicle on the basis of the surrounding-area signals and the information signals, in order to drive the motor vehicle in an at least semiautomated manner on the basis of the first region and the second region of the surrounding area of the motor (Continued)

vehicle. A device, a computer program, and a machine-readable storage medium, are also described.

15 Claims, 4 Drawing Sheets

(51) Int. Cl.
 *B60W 40/02* (2006.01)
 *G08G 1/0967* (2006.01)
(52) U.S. Cl.
 CPC ... *B60W 60/0059* (2020.02); *G08G 1/096725* (2013.01); *G08G 1/096783* (2013.01); *B60W 2554/406* (2020.02); *B60W 2555/20* (2020.02); *B60W 2556/50* (2020.02)
(58) Field of Classification Search
 CPC .......... B60W 2555/20; B60W 2556/50; G08G 1/096725; G08G 1/096783
 See application file for complete search history.

(56) References Cited

U.S. PATENT DOCUMENTS

| | | | |
|---|---|---|---|
| 2017/0212515 A1* | 7/2017 | Bertollini | G05D 1/0276 |
| 2018/0315314 A1* | 11/2018 | Gilsenan | G08G 1/012 |
| 2018/0335781 A1 | 11/2018 | Chase et al. | |
| 2019/0041850 A1* | 2/2019 | Chase | G08G 1/0967 |
| 2019/0047574 A1 | 2/2019 | Nishi et al. | |
| 2019/0202467 A1* | 7/2019 | Sun | B60W 50/14 |
| 2019/0354101 A1* | 11/2019 | Sujan | B60W 60/005 |

FOREIGN PATENT DOCUMENTS

| | | |
|---|---|---|
| DE | 102015205133 A1 | 9/2016 |
| DE | 102018110086 A1 | 10/2018 |
| DE | 102017213204 A1 | 2/2019 |
| EP | 3366539 A2 | 8/2018 |

* cited by examiner

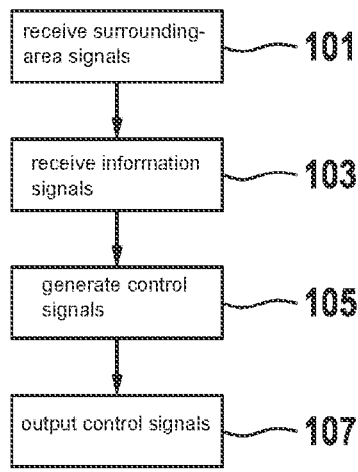
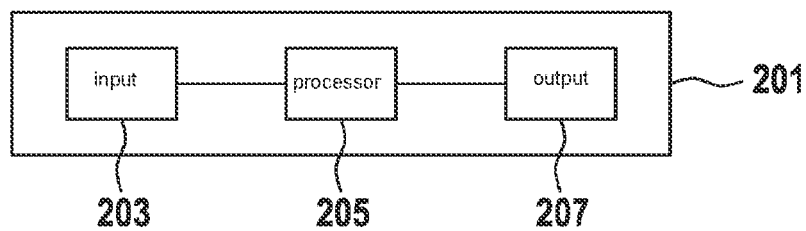
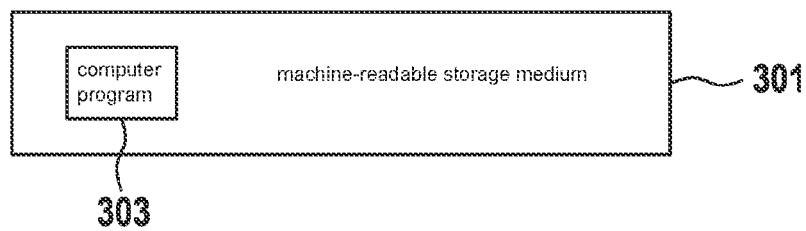

METHOD FOR DRIVING A MOTOR VEHICLE IN AN AT LEAST SEMIAUTOMATED MANNER

FIELD

The present invention relates to a method for driving a motor vehicle in an at least semiautomated manner. In addition, the present invention relates to a device, a computer program and a machine-readable storage medium.

BACKGROUND INFORMATION

Motor vehicles, which are able to be driven in an at least semiautomated manner, include, as a rule, a surround sensor system, with the aid of which a surrounding area of the motor vehicle is monitored. The motor vehicle may be driven in an at least semiautomated manner on the basis of the monitored surrounding area.

SUMMARY

An object of the present invention is to provide for efficiently driving a motor vehicle in an at least semiautomated manner.

This object may achieved with the aid of the present invention. Advantageous refinements and embodiments of the present invention are disclosed herein.

According to a first aspect of the present invention, a method for driving a motor vehicle in an at least semiautomated manner is provided. In accordance with an example embodiment of the present invention, the method includes the following steps:

receiving surrounding-area signals, which represent a first region of a surrounding area of the motor vehicle monitored with the aid of a surround sensor system of the motor vehicle;

receiving information signals, which represent information that is ascertained outside of the motor vehicle and is in regard to a second region of the surrounding area of the motor vehicle;

generating and outputting control signals for controlling the lateral and/or longitudinal guidance of the motor vehicle on the basis of the surrounding-area signals and the information signals, in order to drive the motor vehicle in an at least semiautomated manner on the basis of the first region and the second region of the surrounding area of the motor vehicle.

According to a second aspect of the present invention, a device is provided, which is configured to execute all of the steps of the method according to the first aspect.

According to a third aspect of the present invention, a computer program is provided, which includes commands that, in response to the execution of the computer program by a computer, for example, by the device according to the second aspect, cause it to implement a method according to the first aspect.

According to a fourth aspect of the present invention, a machine-readable storage medium is provided, in which the computer program according to the third aspect is stored.

An example embodiment of the present invention is based on the finding, and also incorporates it, that in addition to the surrounding area monitored with the aid of the surround sensor system of the motor vehicle, further information, which has been ascertained outside of the motor vehicle, is used for driving the motor vehicle in an at least semiautomated manner.

In this manner, more information is available for driving in an at least semiautomated manner in comparison with the case, which is described in the introductory description, and in which the motor vehicle is driven in an at least semiautomated manner based on only the surrounding area monitored with the aid of the surround sensor system of the motor vehicle.

A surround sensor system of the motor vehicle has, as a rule, a limited range, which means that regions outside of the range of the surround sensor system are not able to be monitored.

However, such regions may be monitored, for example, with the aid of a surround sensor system outside of the vehicle; the monitored regions being made available, for example, as information for driving the motor vehicle in an at least semiautomated manner.

This acts in a manner equivalent to an increase in the range of the surround sensor system of the motor vehicle.

Consequently, this produces, in particular, the technical advantage that efficient driving of a motor vehicle in an at least semiautomated manner is provided.

According to one specific embodiment of the present invention, a permissibility of driving the motor vehicle in an at least semiautomated manner is checked on the basis of the information signals (and, in particular, on the basis of the surrounding-area signals); the control signals being generated and outputted on the basis of a result of the check of the permissibility.

This produces, for example, the technical advantage that the control signals may be generated and outputted efficiently.

According to one specific embodiment of the present invention, if the result of the check of the permissibility indicates that driving the motor vehicle in an at least semiautomated manner is not permissible, then no control signals are generated and outputted.

According to one specific embodiment of the present invention, if the result of the check of the permissibility indicates that driving the motor vehicle in an at least semiautomated manner is permissible, then the control signals are generated and outputted.

According to one specific embodiment of the present invention, request signals are outputted, which represent a request for information, ascertained outside of the motor vehicle, about a second region of the surrounding area of the motor vehicle, so that the information signals are received at least partially in response to the outputting of the request signals.

This produces, for example, the technical advantage that the information ascertained outside of the motor vehicle may be requested in an efficient manner.

For example, the information signals are also transmitted to the motor vehicle without a request for information ascertained outside of the motor vehicle.

Thus, this means that according to one specific embodiment of the present invention, information signals may be received without corresponding request signals having been outputted previously.

According to one specific embodiment of the present invention, information signals are only transmitted to the motor vehicle, if corresponding request signals have been previously outputted.

This means, in particular, that according to one specific embodiment of the present invention, information signals may only be received after request signals have been outputted.

According to one specific embodiment of the present invention, a combination of the two specific embodiments described above may be provided. This means, in particular, that some of the received information signals are received in response to the outputting of the request signals; other information signals also being received without corresponding request signals being outputted.

According to one specific embodiment of the present invention, remote control signals are received, which represent a remote control command for controlling the motor vehicle remotely; the control signals being generated and outputted on the basis of the remote control signals.

This produces, for example, the technical advantage that the control signals are generated and outputted efficiently.

If the singular is used for the remote control command, the plural should always be understood, as well, and vice versa.

This produces, in particular, the technical advantage that the motor vehicle may be controlled remotely in an efficient manner.

According to one specific embodiment of the present invention, in the case of a motor vehicle driven manually, transfer request signals are received, which represent a transfer request that the motor vehicle should no longer be driven manually, but in an at least semiautomated manner; in response to the reception of the transfer request signals, it being checked, on the basis of the information signals, if the motor vehicle is able to be driven in an at least semiautomated manner; the control signals being generated and outputted on the basis of a result of the check.

This produces, for example, the technical advantage that the control signals are generated and outputted efficiently. Furthermore, this produces, in particular, the technical advantage that the checking may be carried out efficiently. In particular, information, which is, for example, not ascertainable by the motor vehicle, in particular, not ascertainable by the surround sensor system of the motor vehicle, is advantageously available for the checking.

The checking may be carried out, for example, on the basis of the surrounding-area signals, as well.

If, for example, the result indicates that the motor vehicle may not be guided in an at least semiautomated manner, then no control signals are generated and outputted. Therefore, this means that the transfer request has been denied.

For example, if the result indicates that the motor vehicle may be guided in an at least semiautomated manner, then control signals are generated and outputted. Thus, this means, in particular, that in this case, the transfer request is executed and/or accepted.

Since more information is available for the check, a transfer to at least semiautomated driving may take place earlier than, when only the surrounding-area signals are available. This produces a particularly user-friendly transfer for the driver.

In one specific embodiment of the present invention, the transfer request is denied, if the check has determined one or more of the following traffic situations: dangerous spot lying ahead, in particular, an accident, slippery spot, wetness, fog, traffic jam, construction site, narrowing, in particular, a dangerous spot lying ahead in the traffic lane of the motor vehicle.

In the case in which the transfer request is accepted, according to one specific embodiment, it is checked if the motor vehicle is only allowed to be driven in an at least semiautomated manner with restrictions; the control signals being generated and outputted on the basis of a result of the check.

A restriction means, for example, that lane changes are not allowed.

According to one specific embodiment of the present invention, at least one driving recommendation is ascertained and outputted on the basis of the information signals.

The at least one driving recommendation includes, for example, executing a lane change or refraining from a lane change.

Thus, for example, a dangerous spot lying ahead may advantageously be reacted to in an efficient manner.

According to one specific embodiment of the present invention, the information includes one or more elements selected from the following group of information items: weather within the second region, traffic within the second region, in particular, lane-specific traffic within the second region, position of a dangerous spot within the second region, type of dangerous spot, recommended action, requirement, regulation.

This produces, for example, the technical advantage that particularly suitable information is used.

Traffic includes, in particular, a traffic density and/or a traffic flow.

Traffic includes, in particular, the information regarding the average speed at which traffic moves within the second region.

According to one specific embodiment of the present invention, the information includes surround-sensor data of one or more surround sensors, which are outside of the vehicle and may also be referred to as infrastructure surround sensors that monitor the second region and/or are configured to monitor the second region. Thus, the surround-sensor data represent the second region monitored with the aid of the infrastructure surround sensors.

According to one specific embodiment of the present invention, the control signals include control signals for controlling the lateral and longitudinal guidance of the motor vehicle in an at least semiautomated manner, in order to drive the motor vehicle in an at least semiautomated manner within a traffic lane (and, in particular, at a predetermined distance from a further motor vehicle traveling in front of the motor vehicle).

This produces, for example, the technical advantage that the motor vehicle may be driven efficiently within a traffic lane.

According to one specific embodiment of the present invention, prior to a lane change, it is checked if a lane change is useful and/or permissible on the basis of the information signals (and, in particular, on the basis of the surrounding-area signals); the control signals being generated and outputted on the basis of a result of the check as to whether a lane change is useful and/or permissible, in order to carry out, based on the result, a motor-vehicle lane change controlled in an at least semiautomated manner.

A technical advantage of this is, for example, that a lane change may be carried out efficiently.

For example, if the result of the check as to whether a lane change is useful and/or permissible, indicates that a lane change is not useful and/or not permissible, then no corresponding control signals are generated and outputted, which means that the motor vehicle may not carry out a lane change controlled in an at least semiautomated manner.

For example, if the result of the check as to whether a lane change is useful and/or permissible, indicates that a lane change is useful and/or permissible, then corresponding control signals are generated and outputted, which means that the motor vehicle may carry out a lane change controlled in an at least semiautomated manner.

In the spirit of the description, a region lies, for example, in front of the motor vehicle, on the left side of the motor vehicle, on the right side of the motor vehicle, or in back of the motor vehicle, with respect to a direction of travel of the motor vehicle.

In the spirit of the description, a region lies, for example, in any direction at all with respect to a direction of travel of the motor vehicle.

According to one specific embodiment of the present invention, the information signals represent information, which is ascertained outside of the motor vehicle and is in regard to a third region of the surrounding area of the motor vehicle.

Variants, which are made in connection with the second region, apply analogously to the third region, and vice versa.

For example, the second region may lie closer to the motor vehicle than the third region, or vice versa.

According to one specific embodiment of the present invention, the surround sensor system of the motor vehicle includes one or more surround sensors.

In the spirit of the description, a surround sensor is, for example, one of the following surround sensors: radar sensor, lidar sensor, ultrasonic sensor, magnetic field sensor, infrared sensor, and video sensor.

For example, information ascertained outside of the motor vehicle may be ascertained, using a surround sensor system outside of the motor vehicle.

Variants, which are made in connection with the surround sensor system of the motor vehicle, apply analogously to the surround sensor system outside of the motor vehicle.

For example, the surround sensor system outside of the motor vehicle includes a plurality of surround sensors that are distributed spatially within an infrastructure, in which the motor vehicle is located.

The wording "driving in an at least semiautomated manner" includes one or more of the following cases: assisted driving, semiautomated driving, highly automated driving, fully automated driving.

Assisted driving means that a driver of the motor vehicle permanently carries out either the lateral or the longitudinal guidance of the motor vehicle. The other respective driving task (that is, controlling the longitudinal or the lateral guidance of the motor vehicle) is carried out automatically. Therefore, this means that in the case of assisted driving of the motor vehicle, either the lateral or the longitudinal guidance is controlled automatically.

Semiautomated driving means that in a specific situation (for example: driving on an expressway, driving within a parking lot, passing an object, driving within a traffic lane, which is defined by lane markings) and/or for a certain period of time, longitudinal and lateral guidance of the motor vehicle are controlled automatically. A driver of the motor vehicle does not have to manually control the longitudinal and lateral guidance of the motor vehicle himself/herself. However, the driver must monitor the automatic control of the longitudinal and lateral guidance continuously, in order to be able to manually intervene, if necessary. The driver must be ready to completely take over the driving of the motor vehicle at any time.

Highly automated driving means that for a certain period of time, in a specific situation (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance continuously, in order to be able to intervene manually, as required. If necessary, a take-over request to the driver for assuming the control of the longitudinal and lateral guidance is outputted automatically, in particular, outputted with adequate time to spare. Thus, the driver must be potentially able to take over the control of the longitudinal and lateral guidance. Limits of the automatic control of the lateral and longitudinal guidance are detected automatically. In the case of highly automated driving, it is not possible to bring about a minimum-risk state automatically in every initial situation.

Fully automated driving means that in a specific situation (for example: driving on an expressway, driving within a parking lot, passing an object, driving within a traffic lane, which is defined by lane markings), longitudinal and lateral guidance of the motor vehicle are controlled automatically. A driver of the motor vehicle does not have to manually control the longitudinal and lateral guidance of the motor vehicle himself/herself. The driver does not have to monitor the automatic control of the longitudinal and lateral guidance, in order to be able to intervene manually, as required. Prior to an end of the automatic control of the lateral and longitudinal guidance, a request for the driver to take over the driving task (controlling the lateral and longitudinal guidance of the motor vehicle) is made automatically, in particular, with adequate time to spare. If the driver does not assume the driving task, then a return is made automatically to a minimum-risk state. Limits of the automatic control of the lateral and longitudinal guidance are detected automatically. In all situations, it is possible to return automatically to a minimum-risk system state.

Technical functions of the device according to the second aspect are derived analogously from corresponding technical functions from the method according to the first aspect, and vice versa.

Therefore, this means that, in particular, device features follow from corresponding method features, and vice versa.

According to one specific embodiment of the present invention, the method according to the first aspect is executed with the aid of the device according to the second aspect.

In one specific embodiment of the present invention, the method according to the first aspect is a computer-implemented method.

Exemplary embodiments of the present invention are represented in the figures and explained in greater detail in the following description.

BRIEF DESCRIPTION OF THE DRAWINGS

FIG. 1 shows a flow chart of a first method for driving a motor vehicle in an at least semiautomated manner, in accordance with an example embodiment of the present invention.

FIG. 2 shows a device in accordance with an example embodiment of the present invention.

FIG. 3 shows a machine-readable storage medium, in accordance with an example embodiment of the present invention.

DETAILED DESCRIPTION OF EXAMPLE EMBODIMENTS

Figure 4:
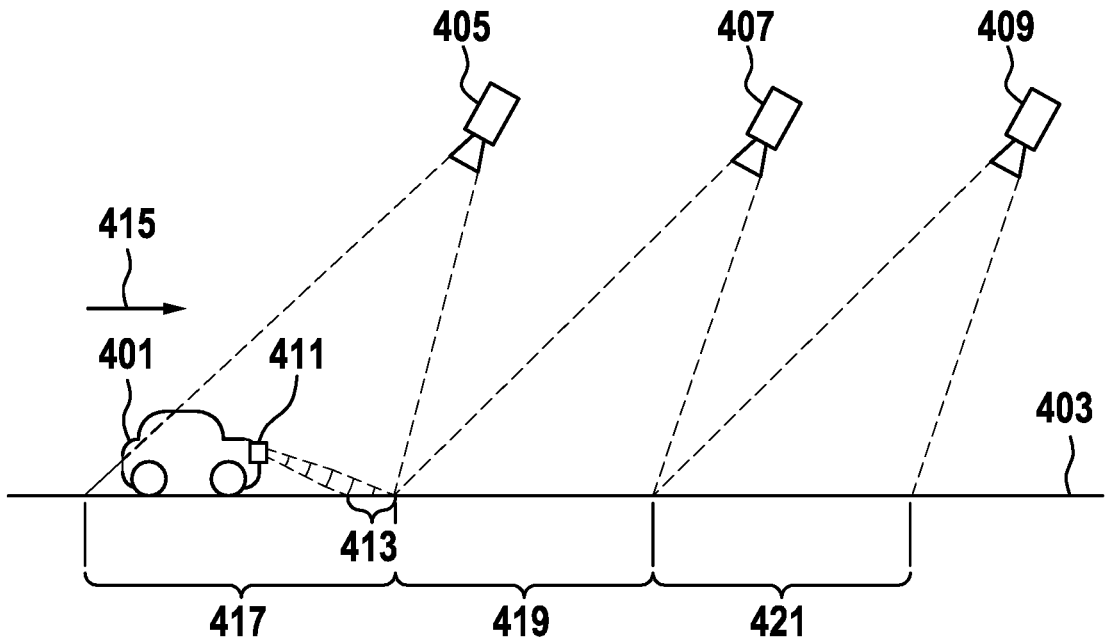
FIGS. 4 and 5 each show three surround sensors, which monitor regions in front of a motor vehicle with respect to a direction of travel of the motor vehicle.

FIG. 1 shows a flow chart of a first method for driving a motor vehicle in an at least semiautomated manner.

The method includes the following steps:
- receiving 101 surrounding-area signals, which represent a first region of a surrounding area of the motor vehicle monitored with the aid of a surround sensor system of the motor vehicle;
- receiving 103 information signals, which represent information that is ascertained outside of the motor vehicle and is in regard to a second region of the surrounding area of the motor vehicle;
- generating 105 and outputting 107 control signals for controlling the lateral and/or longitudinal guidance of the motor vehicle on the basis of the surrounding-area signals and the information signals, in order to drive the motor vehicle in an at least semiautomated manner on the basis of the first region and the second region of the surrounding area of the motor vehicle.

FIG. 2 shows a device 201.

Device 201 is configured to execute all of the steps of the method according to the first aspect.

Device 201 includes an input 203, which is configured to receive the surrounding-area signals and the information signals.

Device 201 further includes a processor 205 (or, in a specific embodiment not shown, a plurality of processors), which is configured to generate the control signals on the basis of the surrounding-area signals and the information signals.

Device 201 further includes an output 207, which is configured to output the control signals.

FIG. 3 shows a machine-readable storage medium 301.

A computer program 303 is stored in machine-readable storage medium 301. Computer program 303 includes commands that, in response to the execution of computer program 303 by a computer, cause it to carry out a method according to the first aspect.

FIG. 4 shows a motor vehicle 401, which is traveling on a roadway 403. Roadway 403 may be, for example, the multilane roadway 601 according to FIG. 6.

Three surround sensors outside of the motor vehicle are provided: a first surround sensor 405, a second surround sensor 407, and a third surround sensor 409.

The three surround sensors 405, 407, 409 are, for example, video sensors, which are each contained by a respective video camera.

The three surround sensors 405, 407, 409 may also be referred to as infrastructure surround sensors, if these are distributed spatially within an infrastructure, in which motor vehicle 401 is located.

The infrastructure includes, for example, roadway 403.

The three surround sensors 405, 407, 409 cover and/or monitor regions of roadway 403.

Motor vehicle 401 is configured to be driven in an at least semiautomated manner.

Motor vehicle 401 includes, for example, the device 201 according to FIG. 2.

Motor vehicle 401 includes a radar sensor 411, which is positioned on the front side of motor vehicle 401.

Radar sensor 411 monitors a first region 413 of roadway 403, which is situated in front of motor vehicle 401 with respect to a direction of travel of the motor vehicle.

A direction of travel of motor vehicle 401 is indicated symbolically by an arrow having the reference numeral 415.

Due to a predefined range of radar sensor 411, regions of roadway 403, which are further away from first region 413, may not be monitored with the aid of radar sensor 411.

This may advantageously be compensated for at least partially by the presence of the three infrastructure surround sensors 405, 407, 409, since these may monitor regions in a surrounding area of motor vehicle 401, which are outside of a range of radar sensor 411.

In particular, first surround sensor 405 monitors a second region 417 of roadway 403. At this juncture, it is made clear that although FIG. 4 could give the impression that first surround sensor 405 also monitors a region directly in back of motor vehicle 401 with respect to direction of travel 415, first surround sensor 405 is not able to monitor this region in back of motor vehicle 401, since motor vehicle 401 blocks and/or covers up this region. However, first surround sensor 405 may monitor, for example, an adjacent traffic lane of motor vehicle 401, which is why the graphic representation used in the figure was selected.

Second surround sensor 407 monitors a third region 419 of roadway 403.

Third surround sensor 409 monitors a fourth region 421 of roadway 403.

These three regions 417, 419, 421 may be referred to as detecting ranges of surround sensors 405, 407, 409 and lie in a surrounding area of the motor vehicle.

According to FIG. 4, motor vehicle 401 is situated in detecting range 417 of first surround sensor 405.

As shown in the configuration of the three surround sensors 405, 407, 409, the three detecting ranges do not overlap but border directly on each other, which means that continuous monitoring of roadway 403 is rendered possible in an advantageous manner.

In particular, the respective surround sensor data of surround sensors 405, 407, 409, which represent a corresponding recording, are transmitted as information signals to motor vehicle 401.

In general, the information signals are transmitted, for example, to motor vehicle 401 via a wireless communications network. Accordingly, the information signals are received, for example, via a wireless communications network.

Based on these information signals, motor vehicle 401, in particular, device 201, may generate and output corresponding control signals.

Figure 5:
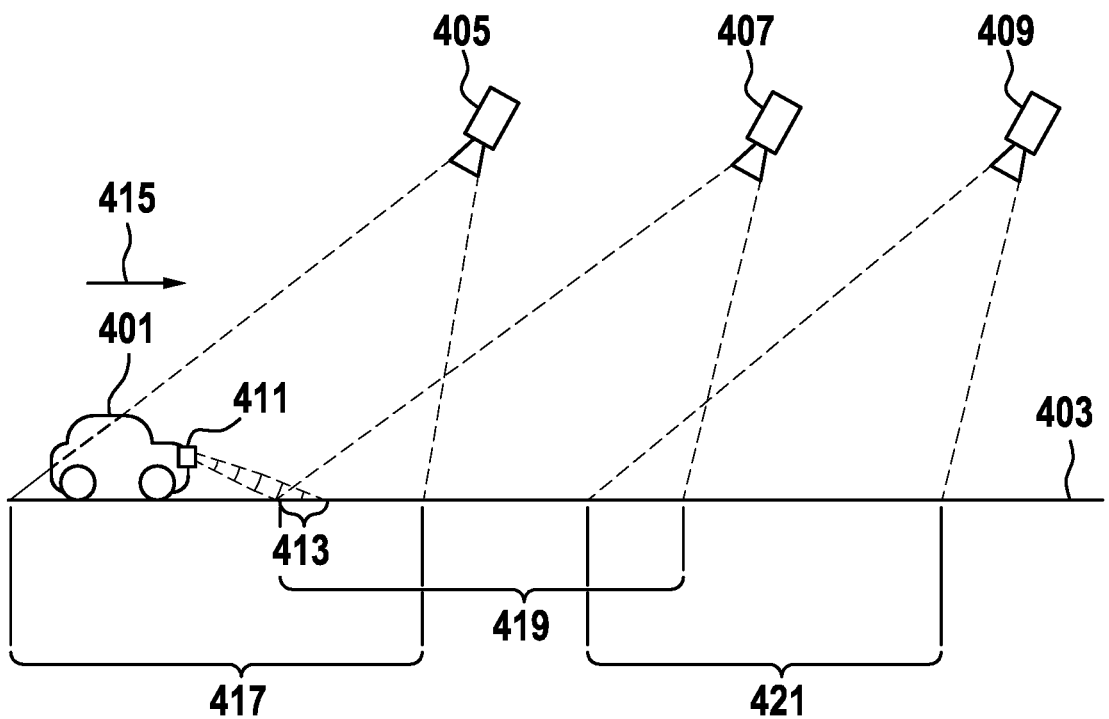

FIG. 5 shows essentially the same thing as FIG. 4, a difference being that the three detecting ranges of the three surround sensors 405, 407, 409 partially overlap.

This means, in particular, that second region 417 overlaps with third region 419. This means that third region 419 overlaps with fourth region 421.

Consequently, particularly efficient and continuous monitoring of roadway 403 is made possible in an advantageous manner.

In a specific embodiment not shown, a spatial configuration of surround sensors is such, that the surround sensors monitor the regions in a redundant manner. Therefore, a margin of safety may be increased in an advantageous manner.

In one further specific embodiment, at least some of the surround sensors are different. In particular, in the above configuration, for example, at least some different surround sensors may be provided. This means that redundant monitoring may be expanded, using diverse, that is, different, sensor technologies, which may advantageously increase a margin of safety even further.

Figure 6:
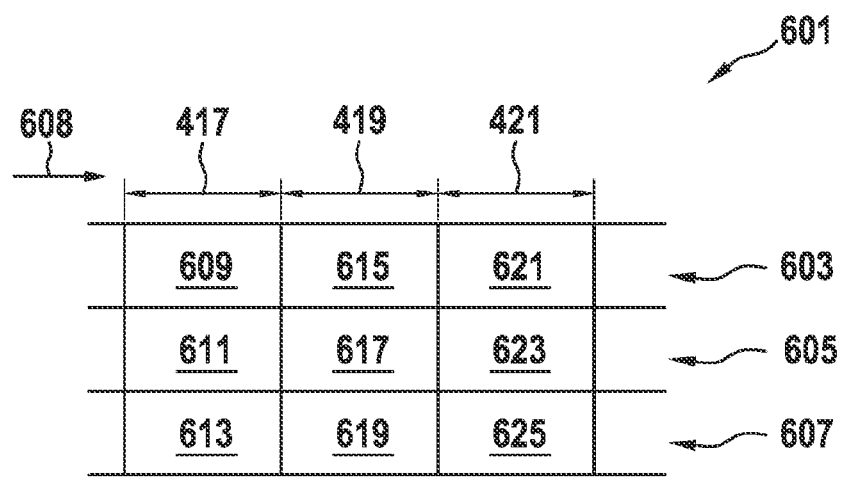
FIG. 6 shows a multilane roadway.

FIG. 6 shows a multilane roadway 601, which is monitored with the aid of the three surround sensors 405, 407, 409.

Multilane roadway 601 includes a left lane 403, a center lane 605, and a right lane 607.

A permissible direction of travel for motor vehicles given by traffic lanes 603, 605, 607 is indicated symbolically by an arrow having reference numeral 608; this direction of travel running from left to right with respect to the plane of the paper.

In this respect, the specifications of left and right with regard to the traffic lanes are to be viewed as relative to specified direction of travel 608.

Reference numeral 609 indicates the region of left lane 603, which is monitored with the aid of first surround sensor 405. Reference numeral 611 indicates the part of center lane 605, which is monitored with the aid of first surround sensor 405. Reference numeral 613 indicates the part of right lane 607, which is monitored with the aid of first surround sensor 405.

Reference numeral 615 indicates the part of left lane 603, which is monitored with the aid of second surround sensor 407. Reference numeral 617 indicates the part of center lane 605, which is monitored with the aid of second surround sensor 407. Reference numeral 619 indicates the part of right lane 607, which is monitored with the aid of second surround sensor 407.

Reference numeral 621 indicates the part of left lane 603, which is monitored with the aid of third surround sensor 409. Reference numeral 623 indicates the part of center lane 605, which is monitored with the aid of third surround sensor 409. Reference numeral 625 indicates the part of right lane 607, which is monitored with the aid of third surround sensor 409.

Thus, lane-specific monitoring of the three traffic lanes 603, 605, 607 is rendered possible in an advantageous manner.

Consequently, lane-specific information may be made available to motor vehicle 401 in an efficient manner.

For example, the information made available to motor vehicle 401 may include the information as to whether or not it is possible, or possible only with restrictions, for motor vehicle 401 to be able to be driven in the corresponding region of the traffic lanes in an at least semiautomated manner.

In a purely illustrative manner, it may be provided that for regions 609, 611, 613 and 615, it is possible for the motor vehicle to be able to be driven within these regions in an at least semiautomated manner without restrictions.

In a purely illustrative manner, it may be provided that for regions 617, 619, 621, 623, it is only possible for the motor vehicle to be driven in a semiautomated manner with restrictions.

A restriction may mean, for example, that within the corresponding region, the motor vehicle may not undertake a lane change and/or may travel at only a predetermined maximum speed.

In a purely illustrative manner, it may be provided that in region 625, motor vehicle 401 is not allowed to be driven in a semiautomated manner.

Based on these specifications and/or information items, a trip of the motor vehicle controlled in an at least semiautomated manner may be planned and executed efficiently.

Figure 7:
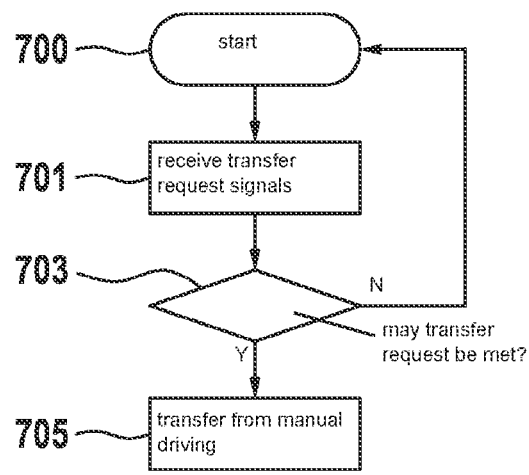
FIG. 7 shows a flow chart of a second method for driving a motor vehicle in an at least semiautomated manner, in accordance with an example embodiment of the present invention.

FIG. 7 shows a flow chart of a second method for driving a motor vehicle in an at least semiautomated manner.

Currently, the motor vehicle is being driven manually.

The method starts in block 700.

According to a step 701, transfer request signals are received, which represent a transfer request that the motor vehicle should no longer be driven manually, but in an at least semiautomated manner.

Step 701 further includes receiving surrounding-area signals and information signals, as already explained above and/or in the following.

According to a step 703, based on the information signals (and, in particular, based on the surrounding-area signals), it is checked whether or not the transfer request may be met.

For example, in step 703, it is checked if a section in front of the motor vehicle is free.

For example, in step 703, the information, which is made available to the motor vehicle with the aid of the three surround sensors 405, 407, 409, is evaluated.

If step 703 reveals that the transfer request may not be met, then, for example, the driver of the motor vehicle is informed that a transfer request has been denied.

Then, for example, the method may be continued again, that is, started again, in block 700.

If, in step 703, it is decided that the transfer request may be met, then, according to a step 705, a transfer from manual driving of the motor vehicle with the aid of the driver, to a device according to the second aspect takes place; the device generating and outputting the corresponding control signals, as explained above and/or in the following, in order to drive the motor vehicle in an at least semiautomated manner.

Figure 8:
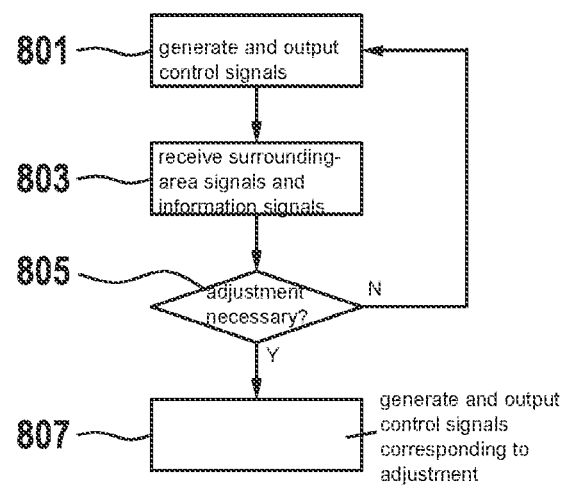
FIG. 8 shows a flow chart of a third method for driving a motor vehicle in an at least semiautomated manner, in accordance with an example embodiment of the present invention.

FIG. 8 shows a flow chart of a third method for driving a motor vehicle in an at least semiautomated manner.

Currently, the motor vehicle is being driven in an at least semiautomated manner.

According to a step 801, appropriate control signals are generated and outputted.

According to a step 803, surrounding-area signals and information signals, as described above and/or in the following, are received.

In a step 805, on the basis of the surrounding-area signals and, in particular, on the basis of the information signals, it is ascertained and/or checked whether or not an adjustment of the at least semiautomated driving of the motor vehicle is necessary.

If no adjustment is necessary, the method continues at step 801.

If no adjustments are necessary, the method is continued at step 807, which provides, e.g., for control signals corresponding to the adjustment to be generated and outputted.

An adjustment may mean, for example, that a maximum speed of the motor vehicle must be reduced. An adjustment may mean, for example, that a distance from a motor vehicle traveling ahead must be reduced or increased. An adjustment may mean, for example, that lane changes are excluded.

The example embodiment described here is based, inter alia, on the fact that the device is supplied or provided further information by, for example, an intelligent infrastructure.

In one specific embodiment, the information includes data, which describe a particular traffic situation lying ahead of the motor vehicle. Thus, the data may include, for example, one or more of the following details:
- a lot of traffic in the left lane in 300 m;
- accident in the right lane in 200 m;
- heavy traffic in all lanes;
- all lanes free;
- in 300 m, the traffic flow in the left lane has a speed of 50 km/h.

In a further specific embodiment, the information not only includes traffic data (which are "seen"/ascertained/known/ become known "directly" by the infrastructure for the section), but is also enhanced by data from other sources, e.g., weather data. Thus, in particular, data, which may have an influence on the performance with regard to driving in an at least semiautomated manner.

In a further specific embodiment, the information includes recommended actions, which are ascertained in the infrastructure. Examples of recommended actions may be as follows:
- carry out a transfer of the "motor vehicle to driver" (the function regarding at least semiautomated driving is no longer permitted);
- no change;
- brake/reduce speed;
- change lane;
- inform driver (e.g., traffic jam, accident).

In a further specific embodiment, the information includes requirements and/or regulations (such as a speed-limit sign).

Examples of requirements and/or regulations may be as follows:
- function regarding at least semiautomated driving is permitted;
- function regarding at least semiautomated driving is no longer permitted;
- function regarding at least semiautomated driving is only permitted under certain conditions.

In one specific embodiment, the information may be requested by the motor vehicle.

In another specific embodiment, the infrastructure transmits the information by itself.

In a further specific embodiment, the two specific embodiments above ("transmit by itself" and "request") may be provided in a common specific embodiment, in particular, may be carried out simultaneously.

If no information is available from the infrastructure, then, in one specific embodiment, the motor vehicle may travel, in particular, may be driven in an at least semiautomated manner, without support from the infrastructure.

In a further specific embodiment, the infrastructure may not only transfer information, but drive the motor vehicle externally (remote control).

One advantage of the present invention is, in particular, that the performance and the availability of the function regarding at least semiautomated driving may be increased greatly.

What is claimed is:

1. A method for driving a motor vehicle in an at least semiautomated manner, comprising the following steps:
   receiving surrounding-area signals which represent a first region of a surrounding area of the motor vehicle monitored using a surround-sensor system of the motor vehicle;
   receiving information signals which represent information that is ascertained outside of the motor vehicle using a plurality of infrastructure surround sensors spatially distributed within an infrastructure in which the motor vehicle is located and is in regard to a plurality of different regions of the surrounding area of the motor vehicle monitored by the plurality of infrastructure surround sensors;
   generating and outputting control signals for controlling a lateral and/or longitudinal guidance of the motor vehicle based on the surrounding-area signals and the information signals, to drive the motor vehicle in the at least semiautomated manner based on the first region and the plurality of different regions of the surrounding area of the motor vehicle;
   wherein detecting regions of the plurality of infrastructure surround sensors either: (i) do not overlap with one another but border directly with each other, or (ii) only partially overlap with one another.

2. The method as recited in claim 1, wherein a permissibility of the at least semiautomated driving of the motor vehicle is checked based on the information signals, and the control signals are generated and outputted based on a result of the check of the permissibility.

3. The method as recited in claim 1, wherein request signals are outputted, which represent a request for information ascertained outside of the motor vehicle, about a second region of the surrounding area of the motor vehicle, so that the information signals are received at least partially in response to the outputting of the request signals.

4. The method as recited in claim 1, wherein remote control signals are received, which represent a remote control command for controlling the motor vehicle remotely; and the control signals are generated and outputted based on the remote control signals.

5. The method as recited in claim 1, wherein the motor vehicle is driven manually, transfer request signals are received which represent a transfer request that the motor vehicle should no longer be driven manually, but in the at least semiautomated manner; in response to the reception of the transfer request signals, it is checked, based on the information signals, if the motor vehicle is able to be driven in the at least semiautomated manner; and the control signals are generated and outputted based on a result of the check.

6. The method as recited in claim 5, wherein the transfer request is denied when the check determines one or more of the following traffic situations: dangerous spot lying ahead including an accident, or slippery spot, or wetness, or fog, or traffic jam, or construction site, or narrowing, or a dangerous spot lying ahead in a traffic lane of the motor vehicle.

7. The method as recited in claim 1, wherein the information includes one or more elements selected from the following group of information items: weather within the second region, traffic within the second region, lane-specific traffic within the second region, position of a dangerous spot within the second region, type of dangerous spot, recommended action, requirement, regulation.

8. The method as recited in claim 1, wherein the control signals include control signals for controlling the lateral and longitudinal guidance of the motor vehicle in an at least semiautomated manner, to drive the motor vehicle in an at least semiautomated manner within a traffic lane.

9. The method as recited in claim 8, wherein prior to a lane change, it is checked, based on the information signals, whether a lane change is useful and/or permissible; and the control signals are generated and outputted based on a result of the check as to whether a lane change is suitable and/or permissible, to carry out a lane change of the motor vehicle controlled in the at least semiautomated manner, based on the result.

10. The method according to claim 1, wherein the detecting regions of the plurality of infrastructure surround sensors do not overlap with one another but border directly with each other.

11. The method according to claim 1, wherein the detecting regions of the plurality of infrastructure surround sensors only partially overlap with one another.

12. The method according to claim 1, wherein the infrastructure is a roadway, and the plurality of infrastructure surround sensors are configured to monitor multiple lanes of the roadway.

13. The method according to claim 12, wherein the information signals include lane-specific information.

14. A device configured for driving a motor vehicle in an at least semiautomated manner, the device configured to:
- receive surrounding-area signals which represent a first region of a surrounding area of the motor vehicle monitored using a surround-sensor system of the motor vehicle;
- receive information signals which represent information that is ascertained outside of the motor vehicle using a plurality of infrastructure surround sensors spatially distributed within an infrastructure in which the motor vehicle is located and is in regard to a plurality of different regions of the surrounding area of the motor vehicle monitored by the plurality of infrastructure surround sensors;
- generate and output control signals for controlling a lateral and/or longitudinal guidance of the motor vehicle based on the surrounding-area signals and the information signals, to drive the motor vehicle in the at least semiautomated manner based on the first region and the plurality of different regions of the surrounding area of the motor vehicle;
- wherein detecting regions of the plurality of infrastructure surround sensors either: (i) do not overlap with one another but border directly with each other, or (ii) only partially overlap with one another.

15. A non-transitory machine-readable storage medium on which is stored a computer program for driving a motor vehicle in an at least semiautomated manner, the computer program, when executed by a computer, causing the computer to perform the following steps:
- receiving surrounding-area signals which represent a first region of a surrounding area of the motor vehicle monitored using a surround-sensor system of the motor vehicle;
- receiving information signals which represent information that is ascertained outside of the motor vehicle using a plurality of infrastructure surround sensors spatially distributed within an infrastructure in which the motor vehicle is located and is in regard to a plurality of different regions of the surrounding area of the motor vehicle monitored by the plurality of infrastructure surround sensors;
- generating and outputting control signals for controlling a lateral and/or longitudinal guidance of the motor vehicle based on the surrounding-area signals and the information signals, to drive the motor vehicle in the at least semiautomated manner based on the first region and the plurality of different regions of the surrounding area of the motor vehicle;
- wherein detecting regions of the plurality of infrastructure surround sensors either: (i) do not overlap with one another but border directly with each other, or (ii) only partially overlap with one another.

* * * * *